US011992852B2

(12) United States Patent
Xiao et al.

(10) Patent No.: US 11,992,852 B2
(45) Date of Patent: May 28, 2024

(54) PROCESS AND DEVICE FOR PREPARING LASER PVC

(71) Applicant: Sichuan Huili Industry Co., Ltd., Sichuan (CN)

(72) Inventors: Shicai Xiao, Sichuan (CN); Wanling Lan, Sichuan (CN); Daiguo Zhao, Sichuan (CN); Yan Jiang, Sichuan (CN); Daiqun Yuan, Sichuan (CN); Jinzhi Bai, Sichuan (CN)

(73) Assignee: Sichuan Huili Industry Co., Ltd., Chengdu (CN)

( * ) Notice: Subject to any disclaimer, the term of this patent is extended or adjusted under 35 U.S.C. 154(b) by 0 days.

(21) Appl. No.: 18/066,293

(22) Filed: Dec. 15, 2022

(65) Prior Publication Data

US 2024/0091803 A1 Mar. 21, 2024

(30) Foreign Application Priority Data

Sep. 16, 2022 (CN) ......................... 202211130828.X

(51) Int. Cl.

*B05B 13/02* (2006.01)
*B05B 15/50* (2018.01)
*B05C 9/14* (2006.01)
*B05C 13/02* (2006.01)
*B05D 3/06* (2006.01)

(52) U.S. Cl.

CPC .......... *B05B 13/0207* (2013.01); *B05B 15/50* (2018.02); *B05C 9/14* (2013.01); *B05C 13/02* (2013.01); *B05D 3/067* (2013.01)

(58) Field of Classification Search

None

See application file for complete search history.

(56) References Cited

U.S. PATENT DOCUMENTS 3,452,181 A * 6/1969 Stryjewski ......... G03G 15/2064 250/319
3,873,025 A * 3/1975 Qvarnstrom ........ B05B 13/0207 239/220
4,605,569 A * 8/1986 Shimada ............... B05C 5/0216 901/41
5,701,815 A * 12/1997 Bocko .................... G02B 5/201 156/277

* cited by examiner

*Primary Examiner* — Charles Capozzi

(57) ABSTRACT

The present invention discloses a process and device for preparing laser PVC. The device includes an upper transmission roller, a support mechanism, a spraying mechanism, an impurity removal mechanism, and a lower transmission roller; the upper transmission roller is disposed above the lower transmission roller, and the two are configured to implement delivery of a PVC film at a station for preparing a laser layer by spraying; the support mechanism is disposed between the upper transmission roller and the lower transmission roller and is in contact with a back surface of the PVC film, and the spraying mechanism is disposed opposite to the support mechanism; and a curing mechanism is disposed in a fitting manner at the coating position; and the impurity removal mechanism is disposed at a front end of the spraying mechanism.

5 Claims, 4 Drawing Sheets

PROCESS AND DEVICE FOR PREPARING LASER PVC

CROSS REFERENCE TO RELATED APPLICATIONS

This application claims priority to Chinese Patent Application No. 202211130828.X filed on Sep. 16, 2022, the disclosure of which is incorporated herein by reference in its entirety.

FIELD

The present invention relates to the technical field of medicine packaging, and in particular, to a process and device for preparing laser PVC.

BACKGROUND

Blister packaging is a common packaging form for medicines. Blister adopts a PVC substrate. PVC is transparent and has no blocking effect on ultraviolet rays, but medicines are relative sensitive to the ultraviolet rays, so that long-term exposure to sunlight may affect the quality of the medicines. Therefore, in the existing technology, a laser layer (UV coating layer) is usually prepared on the PVC substrate, or an anti-ultraviolet additive is added to the PVC substrate to solve the problem.

An existing process for preparing a PVC substrate coated with a laser layer includes: coating a laser layer on a PVC substrate (coating machine)—preliminary curing (UV light curing machine)—laser layer molding (molding machine)—secondary curing (UV light curing machine). In the entire process, a roller-type transmission mechanism is adopted for delivery of the PVC substrate, to deliver the PVC substrate to different stations. The coating machine adopts a downward spraying method to form the laser layer by coating.

The PVC substrate including the laser layer prepared by the foregoing process has the defect of an uneven laser layer.

SUMMARY

An objective of the present invention is to provide a process and device for preparing laser PVC, so as to improve evenness of a laser layer.

The present invention is implemented by the following technical solutions:

A device for preparing laser PVC includes an upper transmission roller, a support mechanism, a spraying mechanism, an impurity removal mechanism, and a lower transmission roller.

The upper transmission roller is disposed above the lower transmission roller, and the upper transmission roller and the lower transmission roller are configured to implement delivery of a PVC film at a station for preparing a laser layer by spraying.

The support mechanism is disposed between the upper transmission roller and the lower transmission roller, the support mechanism is in contact with a back surface of the PVC film, and the spraying mechanism is disposed opposite to the support mechanism and is configured to coat a coating on the PVC film passing across the support mechanism, to form the laser layer; and a curing mechanism is disposed in a fitting manner at a coating position, and the curing mechanism is configured to implement solidification of the coating.

The impurity removal mechanism is disposed at a front end of the spraying mechanism and is configured to remove impurities from a coated surface of the PVC film.

After in-depth analysis of reasons for the unevenness of the existing laser layer, it has been found by the applicant that:

There are two reasons for the unevenness of a laser layer of an existing PVC substrate including the laser layer:

1) After spraying, the coating layer does not cure immediately, and the coating moves on the PVC substrate. Although such the movement is invisible to naked eyes, it leads to uneven distribution of the coating on the PVC substrate during the delivery of the PVC substrate.

2) Impurities on the surface of the PVC substrate: The presence of the impurities on the surface of the PVC substrate also affects the even distribution of the laser layer on the PVC substrate.

Therefore, the foregoing structure of the present invention can reduce the impurities and the movement of the coating on the PVC substrate, and improve the evenness of the laser layer.

The upper transmission roller and the lower transmission roller of the present invention rotate under the drive of a motor to implement delivery of the PVC film in a rotating manner. The implementation of the delivery of the PVC film by using the transmission rollers is an existing technology, the spraying mechanism is an existing technology, and the spraying mechanism includes a spraying head configured to spray a coating on the PVC substrate.

In the present invention, the support mechanism is disposed between the upper transmission roller and the lower transmission roller. The support mechanism is in contact with the back surface of the PVC film and has a specific support function on the PVC film, to enable the PVC film to have a specific tension at the coating position, and in other words, the PVC film is in a tight state at the coating position, which is beneficial to even spraying of the coating on the front surface of the PVC film by the spraying mechanism.

The spraying mechanism and the support mechanism of the present invention are disposed opposite to each other in a horizontal direction. In other words, the present invention adopts horizontal spraying, which can improve the evenness of coating spraying to an extent compared with the existing vertical spraying. In the existing vertical spraying, the PVC film at the spraying position is in a horizontal state, the spraying mechanism is disposed above the PVC film, and the laser layer is prepared by spraying the coating downward through the spraying mechanism. Although the PVC film in the horizontal state has a specific tension under an action of delivery by rollers, the PVC film has a specific weight; and due to the action of the weight of the PVC film, the tensioning effect of the PVC film is worse than that of the present invention, and as a result, the spraying evenness is worse than that of the present invention.

In addition, in the present invention, the impurity removal mechanism is disposed at the front end of the spraying mechanism, and the impurity removal mechanism can perform impurity removal treatment on the front surface of the PVC film, in particular, can remove impurities, such as dust, that affect the evenness of the coating on the front surface of the PVC film, so that there is no impurity or relatively few impurities on the front surface of the PVC film that reach the spraying position, so as to improve the evenness of the coating.

In addition, in the present invention, the curing mechanism is disposed in a fitting manner at the coating position, and the curing mechanism is configured to implement the solidification of the coating. In other words, the curing mechanism of the present invention can preliminarily cure the coating that has just been sprayed on the front surface of the PVC film. Since the present application adopts the horizontal spraying, in which the coating has greater fluidity compared with the vertical spraying, the coating on the front surface of the PVC film may be uneven due to fluidity in a case that the coating sprayed on the front surface of the PVC film cannot be cured quickly in time. Although the fluidity of the coating on the front surface of the PVC film is invisible to naked eyes, it does exist.

To sum up, in the present invention, the coating is sprayed vertically and the support mechanism is configured to support the back surface of the PVC film at the spraying position, so that the PVC film has a relatively great tension at the spraying position, which improves the evenness of the coating to an extent. In addition, the impurity removal mechanism and the curing mechanism are rationally designed according to the specific structure to implement horizontal spraying, and the evenness of the laser layer is improved through a joint action of the support mechanism, the impurity removal mechanism, and the curing mechanism.

The front surface of the PVC film of the present invention specifically refers to the side on which the laser layer is prepared, and the back surface of the PVC film specifically refers to the side opposite to the front surface of the PVC film.

Further, the support mechanism includes a first support column, an outer side of which is provided with a support barrel for supporting the PVC film, two ends of the support barrel are connected to the first support column through a bearing, and the first support column is mounted on a support.

In the present invention, rotation of the support barrel relative to the first support column is implemented through connection by using a bearing. In other words, the first support column is fixed, and the support barrel rotates under the action of the PVC film, to reduce friction on the PVC film.

Further, the support barrel is made of a transparent material, and the curing mechanism is an ultraviolet lamp tube, which is mounted on the first support column and is disposed on an inner side of the support barrel.

The transparent material is preferably glass, and ultraviolet rays emitted by the ultraviolet lamp tube pass through the glass to cure the coating.

Further, the ultraviolet lamp tube is disposed in parallel with the first support column, and an illumination coverage of the ultraviolet lamp tube includes the coating position and a contact position between the PVC film and the support barrel above the coating position.

The foregoing arrangement can implement curing of the coating on the front surface of PVC film.

Further, a spraying position of the spraying mechanism corresponds to a center line of a contact position between the PVC film and the support barrel.

A contact surface between the PVC film and the support barrel is an arc surface, and the center line is at a highest point of the arc surface.

Further, the impurity removal mechanism includes a contact-type wiping body and a fixing frame for securing the contact-type wiping body.

An end surface of the contact-type wiping body is in contact with the front surface of the PVC film, and impurities on the front surface of the PVC film are removed by contacting the contact-type wiping body with the front surface of the PVC film.

Further, the fixing frame includes a fixing seat and a positioning frame, the positioning frame is configured to mount the contact-type wiping body, and the positioning frame is connected to the fixing seat by an elastic member.

In the present invention, by disposing the elastic member, vibration contact between the contact-type wiping body and the front surface of the PVC film can be implemented by using an elastic force of the elastic member, which is beneficial to improving the impurity removal effect.

Further, the positioning frame includes a fixing groove and two clamping plates, one ends of the two clamping plates are rotatably connected, the two clamping plates are provided with corresponding threaded holes, the contact-type wiping body is an elongated, strip-like sponge, which is secured between the two clamping plates by a bolt and has a part protruding from the two clamping plates, an end portion of the elongated, strip-like sponge is in contact with the front surface of the PVC film, the two clamping plates are detachably mounted in the fixing groove, and the fixing groove and the fixing seat are connected by the elastic member.

Preferably, there is a gap between a lower part of an end portion of the elongated, strip-like sponge and the front surface of the PVC film for discharging impurities.

Further, the positioning frame includes a fixing plate, which is provided with at least two sets of fixing components, each set of fixing components includes two support rods symmetrically disposed, a rotating shaft is disposed between the two support rods, the contact-type wiping body is a barrel-like sponge, which is wrapped on the rotating shaft, and the barrel-like sponge on each set of fixing components is capable of being in rolling contact with the front surface of the PVC film.

Further, the device of the present invention also includes an elastic pressing mechanism fitted with the impurity removal mechanism.

The elastic pressing mechanism includes a positioning plate, a pressing body, a second support column, and a connecting rod.

The pressing body is in contact with the back surface of the PVC film and is configured to press the PVC film; and two positioning plates are provided, and two ends of the pressing body are detachably connected to the two positioning plates, respectively.

One end of the second support column is connected to the impurity removal mechanism, the other end is recessed inward to form a recess, a bottom portion of which is provided with an elastic member, and the second support column is symmetrically provided with two strip-shaped through grooves, which are in communication with the recess; and two ends of the connecting rod are connected to the positioning plate and the elastic member, respectively, and the connecting rod is provided with a through hole and further includes a locking bolt for fitting with the through holes and the strip-shaped through grooves to secure the connecting rod.

If the impurity removal mechanism is directly used to squeeze the PVC film for removing impurities, the PVC film may be bent under a force, resulting in a small contact force or even no contact between the impurity removal mechanism and the PVC film. Therefore, in the present invention, an elastic support mechanism is designed, so that the impurity removal mechanism is ensured to always act on the PVC film.

A process for preparing laser PVC includes enabling a PVC film to be sequentially subjected to laser layer coating, preliminary curing, laser layer molding, and secondary curing, where the laser layer coating adopts the foregoing device.

Compared with the existing technology, the present invention has the following advantages and beneficial effects:

1. In the present invention, the coating is sprayed horizontally and the support mechanism is configured to support the back surface of the PVC film at the spraying position, so that the PVC film has a relatively great tension at the spraying position, which improves the evenness of the coating to an extent. In addition, the impurity removal mechanism and the curing mechanism are rationally designed according to a specific structure for implementing horizontal spraying, the impurity removal mechanism and the curing mechanism are respectively configured to remove impurities from the front surface of the PVC film before spraying, to prevent the impurities from affecting the evenness of the coating, and to cure the coating, to prevent the fluidity of the coating caused by inclination of the PVC film from affecting the evenness of the coating, so that the evenness of the laser layer is improved through a joint action of the support mechanism, the impurity removal mechanism, and the curing mechanism.

2. By mounting the ultraviolet lamp tube in the support barrel, the present invention can not only implement the curing of the coating, but also simplify the structure and save space.

3. In the present invention, the positioning frame and the fixing seat are connected by the elastic member, and vibration contact between the contact-type wiping body and the front surface of the PVC film can be implemented by using an elastic force of the elastic member, which is beneficial to improving the impurity removal effect.

BRIEF DESCRIPTION OF THE DRAWINGS

The drawings illustrated herein are used to provide a further understanding of the embodiments of the present invention, and constitute a part of the present application, and do not constitute a limitation to the embodiments of the present invention. In the drawings.

Figure 1:
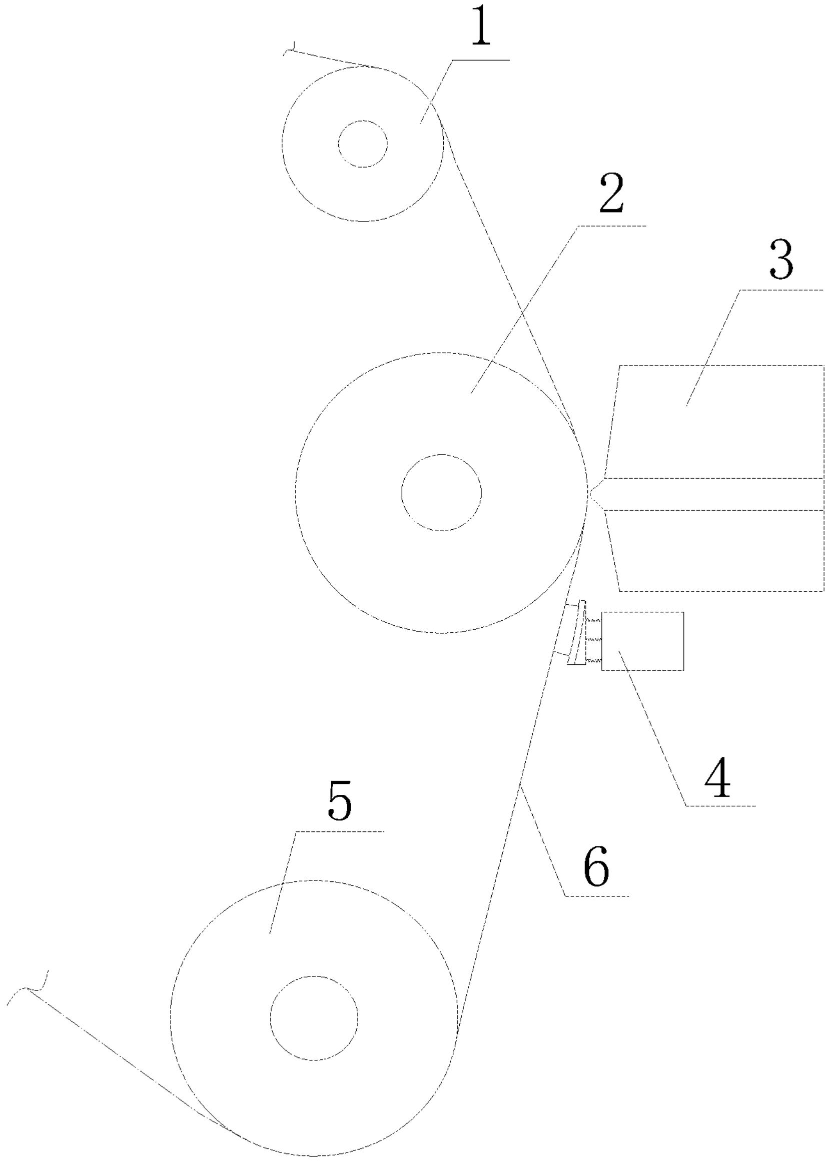
FIG. 1 is a schematic diagram of a device for preparing laser PVC according to according to Embodiment 1 of the present invention.
Figure 2:
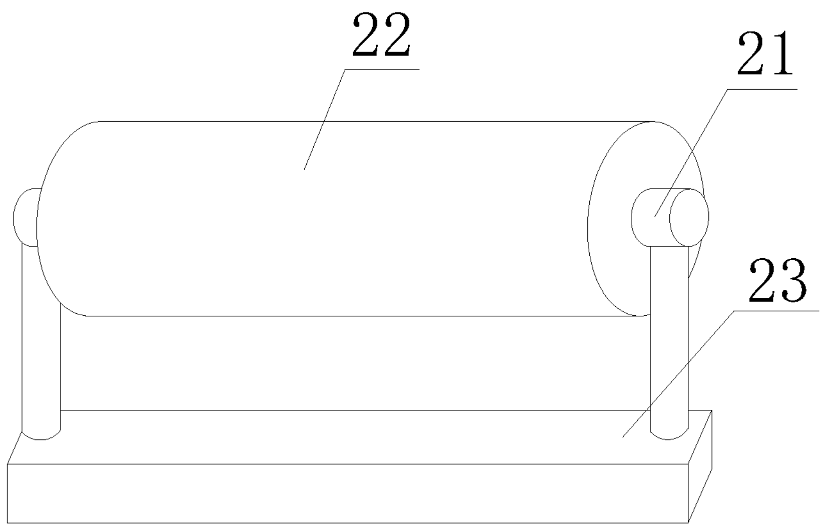
FIG. 2 is a schematic diagram of a structure of a support mechanism according to according to Embodiment 1 of the present invention.
Figure 3:
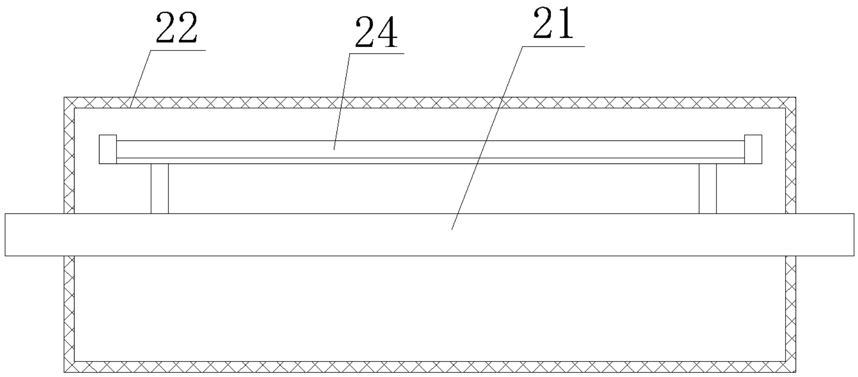
FIG. 3 is a cross-sectional view of the support mechanism according to according to Embodiment 1 of the present invention.
Figure 4:
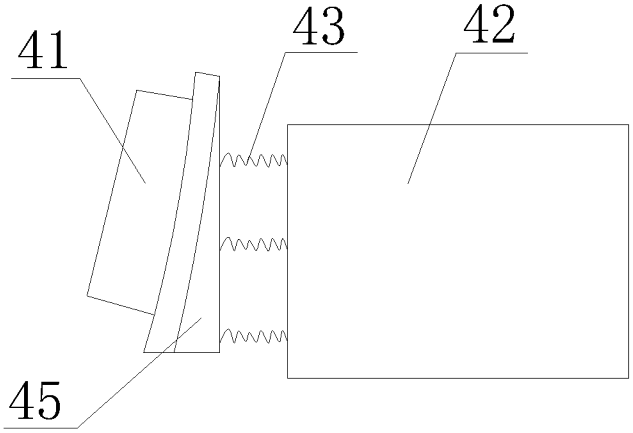
FIG. 4 is a schematic diagram of a structure of an impurity removal mechanism according to Embodiment 1 of the present invention.
Figure 5:
FIG. 5 is schematic diagram of a structure in which clamping plates are configured to clamp an elongated, strip-like sponge according to Embodiment 1 of the present invention.

Reference signs in the drawings and names of corresponding components:

1—upper transmission roller, 2—support mechanism, 3—spraying mechanism, 4—impurity removal mechanism, 5—lower transmission roller, 6—PVC film, 7—elastic pressing mechanism, 21—first support column, 22—support barrel, 23—support, 24—ultraviolet lamp tube, 41—contact-type wiping body, 42—fixing seat, 43—elastic member, 44—clamping plate, 45—fixing groove, 46—fixing plate, 47—rotating shaft, 48—support rod, 71—positioning plate, 72—pressing body, 73—second support column, 74—positioning hole, 75—connecting rod, 76—locking bolt, and 77—elastic member.

DETAILED DESCRIPTION

To make the objectives, technical solutions and advantages of the present invention clearer, the present invention is further described in detail below in combination with the embodiments and drawings. The illustrative implementations and descriptions of the present invention are only configured to explain the present invention, and are not intended to limit the present invention.

Embodiment 1

As shown in FIG. 1 to FIG. 5, a device for preparing laser PVC includes an upper transmission roller 1, a support mechanism 2, a spraying mechanism 3, an impurity removal mechanism 4, and a lower transmission roller 5.

The upper transmission roller 1 is disposed above the lower transmission roller 5, the upper transmission roller 1 and the lower transmission roller 5 are configured to implement delivery of a PVC film 6 at a station for preparing a laser layer by spraying, the upper transmission roller 1 and the lower transmission roller 5 are driven to rotate by a motor, and the PVC film 6 is delivered in a rotation manner.

The support mechanism 2 is disposed between the upper transmission roller 1 and the lower transmission roller 5, and the support mechanism 2 is in contact with a back surface of the PVC film 6. The support mechanism 2 includes a first support column 21, an outer side of which is provided with a support barrel 22 for supporting the PVC film 6, two ends of the support barrel 22 are connected to the first support column 21 through a bearing, and two ends of the first support column 21 protrude from the two ends of the support barrel 22 and are mounted on a support 23. To better implement the tensioning effect of the support barrel 22 on the PVC film 6, the support barrel 22 is not in a same vertical direction as the upper transmission roller 1 and the lower transmission roller 5. Specifically, the upper transmission roller 1 and the lower transmission roller 5 may be disposed in a same vertical direction, and the support barrel 22 is disposed close to the spraying mechanism 3 and deviates from the vertical direction in which the upper transmission roller 1 and the lower transmission roller 5 are located. As shown in FIG. 1, the support barrel 22 deviates to the right from the upper transmission roller 1 and the lower transmission roller 5. In this case, basic surfaces of the support barrel 22 and the PVC film 6 are arc surfaces, and the PVC film 6 on the upper and lower sides of the support barrel 22 is inclined with reverse inclination directions. To improve the spraying effect, the spraying position of the spraying mechanism 3 corresponds to a center line of a contact position between the PVC film 6 and the support barrel 22, and as shown in FIG. 1, the center line is at a rightmost apex position of a contact between the support barrel 22 and the PVC film 6.

The spraying mechanism 3 is disposed opposite to the support mechanism 2 and is configured to coat a coating on the PVC film 6 passing across the support mechanism 2, to form a laser layer. The spraying mechanism 3 includes a plurality of spraying heads for spraying the coating on the PVC film 6, the plurality of spraying heads are arranged in a straight line, and the straight line and the center line are in a same horizontal plane.

To implement rapid curing of the coating, a curing mechanism is disposed at the coating position. The curing mechanism is configured to implement solidification of the coating. In this embodiment, the coating is doped with an ultraviolet curing agent, and the prepared laser layer is a UV coating layer. The curing mechanism is an ultraviolet lamp tube 24. To save space, the support barrel 22 is made of a transparent material, the transparent material is glass, and the ultraviolet lamp tube 24 is mounted on the first support column 21 and is disposed inside the support barrel 22. The ultraviolet lamp tube 24 and the first support column 21 are disposed in parallel, and an illumination coverage of the ultraviolet lamp tube 24 includes the coating position and a contact position between the PVC film 6 and the support barrel 22 above the coating position. Specifically, if the support barrel 22 is covered by the PVC film 6 above the horizontal plane by 20°, the ultraviolet lamp tube 24 is mounted at a position where the horizontal plane rotates by 10° counterclockwise, and the horizontal plane is the plane where the straight line and the center line are located.

The impurity removal mechanism 4 is disposed at a front end of the spraying mechanism 3 for removing impurities from a coated surface of the PVC film 6; the impurity removal mechanism 4 includes a contact-type wiping body 41 and a fixing frame for securing the contact-type wiping body 41; the fixing frame includes a fixing seat 42 and a positioning frame, the positioning frame is configured to mount the contact-type wiping body 41, the positioning frame is connected to the fixing seat 42 by an elastic member 43, and the elastic member 43 is a spring.

In this embodiment, the positioning frame includes a fixing groove 45 and two clamping plates 44, one ends of the two clamping plates 44 are rotatably connected, may be connected by a rotating shaft, or may be connected by a loose-leaf binder or a hinge, the two clamping plates 44 are provided with corresponding threaded holes, the contact-type wiping body 41 is an elongated, strip-like sponge, a length of the elongated, strip-like sponge is greater than or equal to a width of the PVC film 6, the elongated, strip-like sponge is secured between the two clamping plates 44 by a bolt, and specific operations include: removing the bolt, opening non-connected ends of the two clamping plates 44, then inserting the elongated, strip-like sponge between the two clamping plates 44, enabling the elongated, strip-like sponge to have a part protruding from the two clamping plates 44, to implement contact between an end portion of the elongated, strip-like sponge and the front surface of the PVC film 6, then causing the bolt to run through the threaded holes, to clamp and secure the elongated, strip-like sponge by the two clamping plates 44, mounting the two clamping plates 44 in the fixing groove 45 by a bolt, the fixing groove 45 being connected to the fixing seat 42 by the elastic member 43, the fixing groove 45 having an opening end, and inserting the two clamping plates 44 into the fixing groove 45 from the opening end and then securing same by a bolt.

In this embodiment, vibration contact between the elongated, strip-like sponge and the front surface of the PVC film 6 can be implemented by using an elastic force of the elastic member 43, which is beneficial to improving the impurity removal effect.

Preferably, there is a gap between a lower part of an end portion of the elongated, strip-like sponge and the front surface of the PVC film for discharging impurities.

Working principles of this embodiment are in the following:

The upper transmission roller 1 and the lower transmission roller 5 are configured to implement the delivery of the PVC film 6 at the station for preparing a laser layer by spraying. When the PVC film 6 is delivered to a position corresponding to the impurity removal mechanism 4, impurity removal treatment is performed on the front surface of the PVC film 6 through the vibration contact between the elongated, strip-like sponge and the front surface of the PVC film 6. Then, the PVC film 6 is delivered to a position corresponding to the spraying mechanism 3, the coating is coated on the PVC film 6 by spraying the coating on the front surface of the PVC film 6 by the spraying mechanism 3. In addition, the ultraviolet lamp tube 24 cures the coating sprayed on the front surface of the PVC film 6, to implement rapid solidification of the coating, thereby avoiding unevenness caused by the fluidity of the inclined coating.

Embodiment 2

Figure 6:
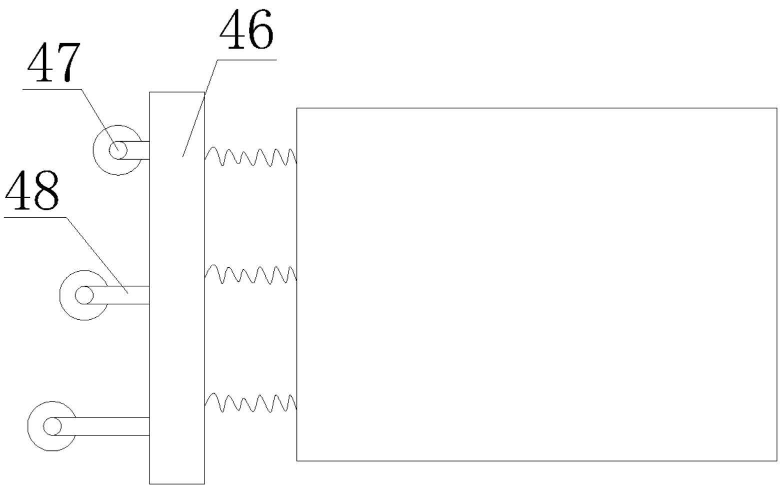
FIG. 6 is a schematic diagram of a structure of an impurity removal mechanism according to Embodiment 2 of the present invention.

As shown in FIG. 6, this embodiment is based on Embodiment 1, and differs from Embodiment 1 in that: the structures of the positioning frame and the contact-type wiping body 41 are different, specifically:

The positioning frame includes a fixing plate 46, which is provided with at least two sets of fixing components, each set of fixing components includes two support rods 48 symmetrically disposed, a rotating shaft 47 is disposed between the two support rods 48, the two support rods 48 are provided with through holes, and end portions of the rotating shaft 47 are inserted into the through holes. The rotating shaft 47 is rotated under the action of an external force. The contact-type wiping body 41 is a barrel-like sponge, which is wrapped on the rotating shaft 47, and the barrel-like sponge on each set of fixing components is capable of being in rolling contact with a front surface of the PVC film 6. Since the PVC film 6 is disposed obliquely below the support barrel 22, the height of the two support rods 48 of different sets of fixing components are gradually reduced from bottom to top.

In this embodiment, the impurity removal treatment is performed on the front surface of the PVC film 6 in a drum-type contact manner, which can improve the impurity removal effect.

Embodiment 3

Figure 7:
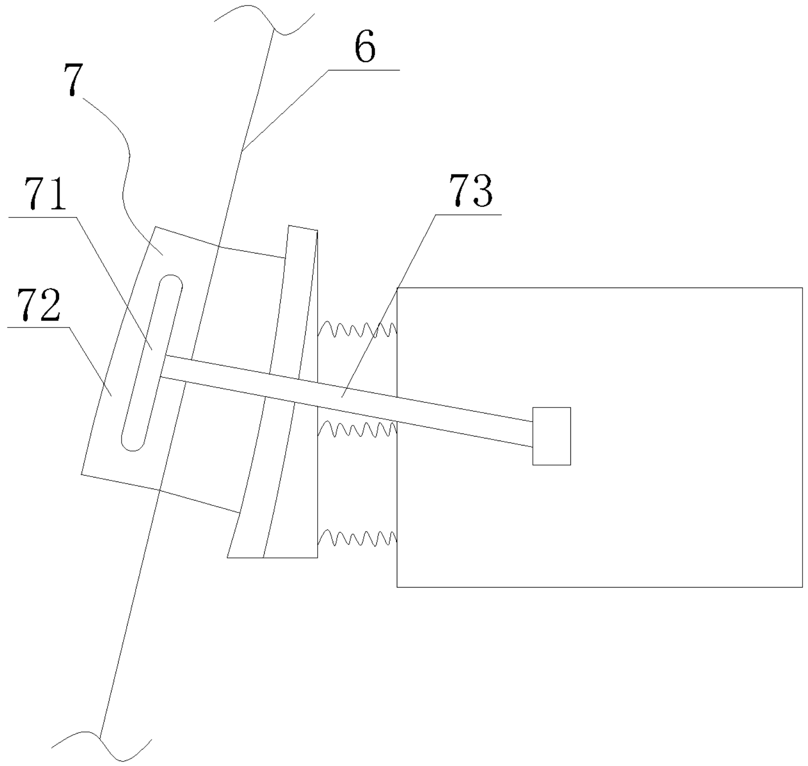
FIG. 7 is a schematic diagram of a structure in which an impurity removal mechanism is fitted with an elastic pressing mechanism according to Embodiment 3 of the present invention.
Figure 8:
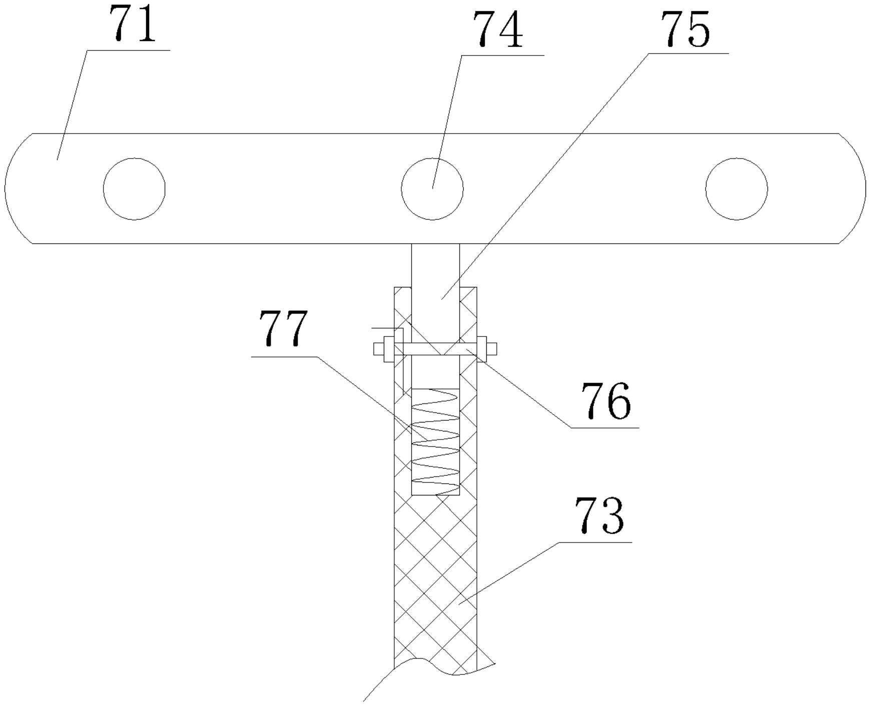
FIG. 8 is a schematic diagram of an elastic pressing mechanism according to Embodiment 3 of the present invention.

As shown in FIG. 7 and FIG. 8, this embodiment is based on Embodiment 1, and the device further includes an elastic pressing mechanism 7 fitted with the impurity removal mechanism 4.

The elastic pressing mechanism 7 includes a positioning plate 71, a pressing body 72, a second support column 73, and a connecting rod 75.

The pressing body 72 is in contact with the back surface of the PVC film 6 and is configured to press the PVC film 6; two positioning plates 71 are provided, and two ends of the pressing body 72 are detachably connected to the two positioning plates 71, respectively. Specifically, the pressing body 72 includes a sponge block, into which a positioning tube is inserted, to improve the pressing effect of the sponge block on the PVC film 6, and the positioning plate 71 is provided with a positioning hole 74, and the positioning hole 74 is in clearance fit with the positioning tube.

One end of the second support column 73 is connected to the impurity removal mechanism 4, the other end is recessed inward to form a recess, a bottom portion of which is provided with an elastic member 77, which is a spring, and the second support column 73 is symmetrically provided with two strip-shaped through grooves, which are in communication with the recess; and two ends of the connecting rod 75 are connected to the positioning plate 71 and the elastic member 77, respectively, and the connecting rod 75 is provided with a through hole and further includes a locking bolt 76 for fitting with the through holes and the strip-shaped through grooves to secure the connecting rod 75.

Working principles of this embodiment are in the following:

After the impurity removal mechanism 4 is mounted, the pressing body 72 is secured on the positioning plate 71 by the positioning tube and the positioning hole 74, then the positioning plate 71 is pressed downward so that the positioning plate 71 can squeeze the PVC film 6, and finally the connecting rod 75 is secured by the locking bolt 76.

In this embodiment, by disposing the elastic pressing mechanism, the impurity removal mechanism 4 can be ensured to always act on the PVC film 6.

Embodiment 4

A process for preparing laser PVC includes enabling a PVC film 6 to be sequentially subjected to laser layer coating, preliminary curing, laser layer molding, and secondary curing. The laser layer coating is implemented by adopting the device described in any one of Embodiment 1 to Embodiment 3, the preliminary curing is implemented by exposure to a UV lamp, the laser layer molding refers to placing the laser layer at a molding temperature of 90° C. for molding, and the secondary curing is implemented by exposure to the UV lamp.

The objectives, technical solutions, and beneficial effects of the present invention are further described in detail in the specific implementations. It should be understood that the above described are only specific implementations of the present invention and are not configured to limit the protection scope of the present invention. Any modification, equivalent replacement, improvement, or the like made within the spirit and principle of the present invention should fall within the protection scope of the present invention.

It should be noted that the structure, scale, size, and the like shown in the drawings attached to the description are only used to match the content disclosed in the description, for a person skilled in the art to understand and read, are not used to limit limiting conditions that can be implemented in the present invention, and therefore do not have a substantial technical significance. Any structural modification, change of proportional relationship or adjustment of size, without affecting the efficacy and the objective that can be achieved in the present invention should still fall within the scope of the technical content disclosed in the present invention. In addition, the terms such as "upper", "lower", "left", "right", "middle", and the like used in the description are only for ease of description, and are not intended to limit the scope of the present invention. The change or adjustment of the relative relationship without substantial changes in the technical content shall also fall within the scope of the present invention.

What is claimed is:

1. A device for preparing laser PVC, comprising an upper transmission roller, a support mechanism, a spraying mechanism, an impurity removal mechanism, and a lower transmission roller, wherein the upper transmission roller is disposed above the lower transmission roller, and the upper transmission roller and the lower transmission roller are configured to implement delivery of a PVC film at a station for preparing a laser layer by spraying; the support mechanism is disposed between the upper transmission roller and the lower transmission roller, the support mechanism is in contact with a back surface of the PVC film, and the spraying mechanism is disposed opposite to the support mechanism and is configured to coat a coating on the PVC film passing across the support mechanism, to form the laser layer; and a curing mechanism is disposed at a coating position, and the curing mechanism is configured to implement solidification of the coating; and the impurity removal mechanism is disposed at a front end of the spraying mechanism and is configured to remove impurities from a coated surface of the PVC film; and the support mechanism comprises a first support column, an outer side of which is provided with a support barrel for supporting the PVC film, two ends of the support barrel are connected to the first support column through a bearing, and the first support column is mounted on a support; and the curing mechanism is an ultraviolet lamp tube, which is mounted on the first support column and is disposed on an inner side of the support barrel; and the spraying mechanism includes a plurality of spraying heads for spraying the coating on the PVC film; and the impurity removal mechanism comprises a contact-type wiping body and a fixing frame for securing the contact-type wiping body, the fixing frame comprises a fixing seat and a positioning frame, the positioning frame is configured to mount the contact-type wiping body, and the positioning frame is connected to the fixing seat by an elastic member; and the positioning frame comprises a fixing plate, which is provided with at least two sets of fixing components, each set of fixing components comprises two support rods symmetrically disposed, a rotating shaft is disposed between the two support rods, the contact-type wiping body is a barrel-shaped sponge, which is wrapped on the rotating shaft, and the barrel-shaped sponge on each set of fixing components is capable of being in rolling contact with a front surface of the PVC film.

2. The device for preparing laser PVC according to claim 1, wherein the support barrel is made of a transparent material.

3. The device for preparing laser PVC according to claim 2, wherein the ultraviolet lamp tube is disposed in parallel with the first support column, and an illumination coverage of the ultraviolet lamp tube comprises the coating position and a contact position between the PVC film and the support barrel above the coating position.

4. The device for preparing laser PVC according to claim 1, wherein a spraying position of the spraying mechanism corresponds to a center line of a contact position between the PVC film and the support barrel.

5. The device for preparing laser PVC according to claim 1, further comprising an elastic pressing mechanism fitted with the impurity removal mechanism, wherein the elastic pressing mechanism comprises a positioning plate, a pressing body, a second support column, and a connecting rod; the pressing body is in contact with the back surface of the PVC film and is configured to press the PVC film; two positioning plates are provided, and two ends of the pressing body are detachably connected to the two positioning plates, respectively; and one end of the second support column is connected to the impurity removal mechanism, the other end of the second support column is recessed inward to form a recess, a bottom portion of which is provided with an elastic member, and the second support column is symmetrically provided with two strip-shaped through grooves, which are in communication with the recess; and two ends of the connecting rod are connected to the positioning plate and the elastic member, respectively, and the connecting rod is provided with a through hole and further comprises a locking bolt for fitting with the through holes and the strip-shaped through grooves to secure the connecting rod.

* * * * *